Patented Aug. 29, 1950

2,520,256

UNITED STATES PATENT OFFICE 2,520,256

METHOD OF PRODUCING GLUCURONIC ACID

Earl A. Peterman, Detroit, Mich.

No Drawing. Application May 28, 1947,
Serial No. 751,141

6 Claims. (Cl. 260—333)

The present invention relates to methods of synthesizing glucuronic acid and salts and compounds thereof, and constitutes an improvement over the processes for the same purposes disclosed in applicant's copending application, Serial No. 629,315, filed November 17, 1945.

In order to synthesize glucuronic acid, it is necessary to oxidize the free primary alcohol (hydroxyl) group on a glucose molecule without breaking the molecule or oxidizing the aldehyde group. Such selective oxidation can be accomplished by coupling the glucose molecule at its aldehyde end with a substance which will protect that end of the molecule from oxidation. Thereafter, the alcohol group on the molecule may be oxidized and the protective substance removed from the aldehyde end of the molecule to produce a glucuronic acid compound. The synthesis of pure glucuronic acid was first successfully carried out, so far as applicant is aware, by the process set forth in the above mentioned copending application. In that process, a glucose compound having a suitable substance coupled on the aldehyde end of the molecule is oxidized by nitrogen dioxide gas and the oxidized material hydrolyzed to free the glucuronic acid. The resulting product, which contained numerous impurities, is then subjected to a rather elaborate extraction process. In view of the fact that on oxidation the glucose compound forms a heavy gummy mass which is not readily penetrated by the nitrogen dioxide, the above mentioned process employed the steps of suspending the material in chloroform in which was dissolved the nitrogen dioxide gas, with the result that the gas, on being released from solution, would force itself way up through the mass of material and effect the necessary oxidation. While the prior process was successful, it was long and costly and the yield of pure glucuronic acid was very low. In particular, a very extended period of from seven to eight days was required to complete the oxidation of the glucose compound, and thereafter elaborate extraction processes were required to produce small quantities of pure glucuronic acid or a salt thereof.

Accordingly, it is the general object of the present invention to improve, simplify, cheapen and increase the speed and yield of the above described prior process of synthesizing glucuronic acid and its salts.

In accordance with the present invention, substantial improvement in the process is realized by a combination of several features. In the first place, it is preferred, although not necessary, to subject to the oxidizing process a pure glucose compound having a protected aldehyde end; secondly, the speed of the oxidation process is greatly increased and its cost reduced by exposing an exceedingly thin film of dry powdered glucose compound directly to the nitrogen dioxide; and, third, the process of purifying the oxidized material is simplified and the yield increased by removing from the oxidized material all uncombined nitrogen compounds prior to the hydrolyzation operation which is employed to remove the protecting substance on the aldehyde end of the molecule.

These three operations, alone, greatly simplify the process of purifying and extracting the glucuronic acid, and materially increase the yield.

In addition to the above, an even more important feature of the invention resides in the step of removing combined nitrogen dioxide from the oxidized material before it is hydrolyzed. This operation, alone, is found to overcome most of the difficulties which have been encountered in previous attempts to synthesize glucuronic acid, and it makes possible a yield of almost one hundred per cent of the theoretical yield of pure glucuronic acid with fewer extraction operations. It is now believed that most of the prior difficulties which were encountered resulted from the previously unrecognized fact that during the oxidation of a protected glucose compound, certain nitroglucose compounds are formed which seriously reduced the yield and which introduce impurities that are very difficult to remove.

The formation of these nitrogen compounds results because in oxidizing a mass of a glucose compound, such as methyl glucoside, with nitrogen dioxide, all of the glucose molecules do not contact with the gas at one time, and hence the reaction progresses slowly through the mass. On each molecule, the carbon atoms tend to oxidize progressively, with the sixth carbon atom being the first to oxidize and then others, probably the second, third, fourth and fifth carbon atoms, in the order stated, the first carbon atom being protected from oxidation, as previously indicated, and the sixth carbon atom being the one which must be oxidized to produce glucuronic acid. When nitrogen dioxide is the oxidizing agent, the reaction occurs in two stages on each carbon atom: first, a coupling of the nitrogen dioxide with the carbon atom; and, second, a release of the nitrogen. The object of the process is to oxidize the sixth carbon atom without affecting the others; but, due to the unavoidable oxidation of some molecules in advance of others in the mass, nitrogen dioxide couples with one or more of the intermediate carbon atoms on those molecules which are first oxidized at the sixth carbon, before the bulk of the material is oxidized at the sixth carbon. If the nitrogen dioxide which is thus coupled to an intermediate carbon atom is driven off as nitrous oxide, leaving an oxygen atom on the carbon, the chain breaks, thus reducing the yield and producing impurities which are difficult to remove. The nitrogen on intermediate carbon atoms may be driven off some of the molecules as nitrous oxide during the oxidizing process if it is carried out too far, or in any case during the subsequent hydrolyzing operation, which occurs at a higher temperature. In addition, nitrogen dioxide may be driven off during the hydrolyzing operation and form nitric acid, which, at the higher temperatures then prevailing and in the presence of another mineral acid, will break the glucose chain. Not only does this cause a substantial reduction in yield and introduce a variety of undesirable glucose derivatives, but, if the nitrogen on intermediate carbons is not driven off, it remains in place and the final product, instead of being pure glucuronic acid, contains various nitroglucuronic acids. All of these difficulties are removed by stopping the oxidizing reaction before any appreciable per cent of the glucose molecules is broken and by then removing all combined nitrogen dioxide at low temperature, which will not break the nitrogen dioxide into oxygen and nitrous oxide.

The raw material for the process may constitute any protected glucose compound. Examples include ethyl glucoside, methyl glucoside, or polymerized glucose compounds, such as edible corn starch and glycogen. However, polymers give a lower yield and, therefore, the simpler nonpolymerized compounds are preferred. Because of its low cost and the ease with which it may be prepared in pure form, the preferred protected glucose compound is methyl glucoside, although, so far as the process, itself, is concerned, ethyl glucoside or glucosides having other protective alcohol ends for the aldehyde group are equally effective as starting materials. It will be understood that for such purposes, compounds of d. glucose (i. e., dextrose) are preferred.

The first step in the process involves the oxidation of the glucoside. This is accomplished by exposing the crystalline glucoside within a closed chamber to an atmosphere comprising a mixture of nitrogen dioxide and oxygen. The ratio of these two gases employed may be varied widely as desired, but one satisfactory proportion is two parts of nitrogen dioxide to one of oxygen. The oxygen is not essential to effect an oxidation of the glucoside, but its presence is highly advantageous for the reason that the reaction between the glucoside and nitrogen dioxide converts the nitrogen dioxide to nitrous oxide (acid). In the presence of oxygen, the nitrous oxide is immediately re-oxidized to nitrogen dioxide, thus preventing a loss of the relatively expensive nitrogen dioxide gas and at the same time preventing the accumulation of nitrous oxide in the oxidized material.

It is essential, in order to speed the reaction, to maintain an intimate contact between the glucoside and the oxidizing gas, and this result may be achieved in several different ways. For example, the crystalline glucoside may be spread in a very thin layer on a supporting surface located within the gas chamber. This layer should preferably be in the order of one-half millimeter in thickness. The supporting surface may be a stationary tray of glass or stainless steel, or it may be a continuously moving stainless steel belt which carries the material through the reaction chamber. The oxidation process develops water, which progressively liquifies the material. Consequently, if desired, the supporting surface may be so inclined that the oxidized material will run off. In the latter case, a series of oppositely inclined supporting surfaces may be provided in the chamber so that the material which runs off one surface drips upon the next lower surface, and so on. Still another method of effecting an even more intimate contact is to drop finely divided crystalline material into an upwardly moving column of oxidizing gas. By properly adjusting the length of the column and the rate of flow of the gas, the descent of the non-oxidized material by gravity may be retarded for a sufficient period to effect substantially complete oxidation before the glucose material, which will then be heavier, reaches a suitable supporting surface at the bottom of the column. If necessary, the oxidation may then be completed by permitting the material to run downwardly over a series of inclined surfaces in the bottom of the gas filled column, as mentioned above.

The speed of the oxidizing reaction varies with the density and the concentration of the nitrogen dioxide. The more concentrated and the denser the nitrogen dioxide, the faster is the reaction. The speed of the reaction also depends on the intimacy of the contact between the gas and glucose material. Since a reduction in the temperature of the gas increases its density, it will be apparent that either a decrease in temperature or an increase in the pressure within the chamber may be employed to increase the speed of the reaction. It is not absolutely essential that all of the glucose material be oxidized, since any residual unoxidized material is removed during the subsequent treatment. Therefore, the only effect of incomplete oxidation is to decrease the yield. It may be more economical, therefore, to reduce the yield in order to save time during the oxidizing operation. As a general guide to the employment of the process, it may be pointed out that with a layer of crystalline glucoside one-half millimeter thick supported on a horizontal plate in a closed chamber at room temperature and atmospheric pressure, with two parts of nitrogen dioxide and one part of oxygen, optimum yields were obtained in about eight hours, but no appreciable reduction in yield was noted until the exposure was extended beyond sixteen hours. Under these circumstances, the gas is preferably given a gentle circulation by cooling one side of the chamber and applying a mild heat to the opposite side. It will be apparent that the exposure time for optimum yields may be reduced by providing a more intimate contact between the nitrogen dioxide and the glucoside.

As soon as the material is oxidized, any combined nitrogen dioxide is then removed, as previously stated, by hydrolysis. This is accomplished by adding dilute sulphuric acid, ten cubic centimeters of five per cent sulphuric acid for each fifty grams of the original glucoside being adequate for this purpose. This operation should be carried out at a temperature not exceeding 40° C., in order to avoid breaking the glucose chain. The nitrogen dioxide which is thus completely removed from the oxidized material within a few minutes either passes off in the form of nitrogen dioxide gas or forms nitric acid with the water present.

The oxidized glucoside (i. e., methyl glucuronic acid, if methyl glucoside is the starting material), together with the water, sulphuric acid, nitric acid and certain impurities, including any cellulosic compounds which may have resulted from a breakdown and/or condensation of the glucoside during oxidation, are then dissolved in absolute alcohol. A strong alcohol solution is required. Hence, if absolute ethyl alcohol is used, the amount added should be approximately ten times the volume of the water added in the previous step. Absolute methyl alcohol in amounts from five to ten times the volume of water may be used, and is preferred.

The sulphuric and nitric acids are then removed from the alcohol solution by addition of an excess of barium carbonate and precipitation of the barium sulphate and barium nitrate or nitrite thus formed. Barium carbonate is almost insoluble in alcohol but nevertheless will progressively dissolve and neutralize the acids to produce the insoluble barium salts. The solution may be maintained at room temperature, but, if warmed to a temperature not above 50° C., the reaction is speeded. One to three hours are required to complete this reaction. The barium carbonate will not react appreciably with the methyl glucuronic acid in a strong alcohol solution. The precipitated barium sulphate and barium nitrate or barium nitrite and excess barium carbonate are then removed by filtration.

Some ethyl or methyl nitrite is formed by reaction between the alcohol (ethyl or methyl) and should be removed by vacuum distillation. This removes all of the volatile ethyl or methyl nitrite, a large part of the water and most of the alcohol, and reduces the product to a syrup.

Since barium nitrate and barium nitrite are soluble in water and the above precipitation of barium nitrate and barium nitrite occurred in an alcohol solution containing some water, there is a possibility that at this stage some of these barium salts remain in the product. This is checked by dissolving a sample in water and adding sulphuric acid. If any precipitate forms, the batch is again dissolved in a strong alcohol solution. Since at this stage less water is present, all of these barium salts will precipitate. The material is then again concentrated to a syrup which is principally methyl glucuronic acid, the only impurities being very small quantities of unoxidized methyl glucoside and cellulosic compounds resulting from the breakdown of glucose chains.

The methyl glucuronic acid, which is then entirely free of all nitrogen but may contain minor amounts of other impurities, is then hydrolyzed with any suitable mineral acid. Sulphuric acid is preferred because it is less destructive to the glucose compound and its salts are readily removed. Hydrochloric acid is somewhat more destructive of the glucose compounds and nitric acid is even less desirable for the same reason, but both may be used, if desired. The methyl glucuronic acid may be hydrolyzed in a one per cent sulphuric acid solution at an elevated temperature, approximately 90° C., at atmospheric pressure, for approximately one hour, or until the methyl alcohol has been completely volatilized and driven off. Since high temperatures and prolonged heating result in decomposition, the temperature should be kept as low as possible without unduly prolonging the time required to complete the operation. Because of the more destructive character of hydrochloric and nitric acids, even lower temperatures should be employed if they are used.

The resulting solution contains pure glucuronic acid and sulphuric acid. The acids are then completely neutralized by the addition of an excess quantity of barium carbonate. The solution is then chilled to precipitate the excess barium carbonate and the precipitate is removed by filtration. The filtrate is concentrated by vacuum distillation to the consistency of a light syrup and poured into absolute alcohol. This precipitates barium glucuronate, which is then filtered out and dried.

In order to remove the barium from the compound, the barium glucuronate is combined with a calculated amount of sulphuric acid solution slightly insufficient in quantity to react with the entire quantity of barium glucuronate present. This forms barium sulphate, which, together with the residual barium glucuronate, may then be precipitated out in absolute alcohol and filtered off. The remaining filtrate is an alcohol solution of pure glucuronic acid. This solution may be subject to vacuum distillation to crystallize out the glucuronic acid, or, if desired, may be neutralized with carbonates of sodium, potassium, calcium or magnesium to produce the corresponding glucuronate. These may either be retained in a water solution or crystallized out by a vacuum distillation.

It will be observed that several of the above described operations involve the precipitation of compounds in absolute alcohol. For this purpose, either ethyl or methyl alcohol is preferred, because of their low cost and availability. However, comparable results may be achieved with any monohydric alcohol, such as propyl and butyl. It is not essential that absolute alcohol be employed, but larger quantities of dilute alcohols are required to produce the same results and, therefore, absolute alcohols are preferred.

At various stages in the process, acids are preferably neutralized by the use of barium carbonate. For this purpose, barium carbonate is preferred because even excess quantities will not produce an alkaline solution due to the relative insolubility of the material. This is desirable since an alkaline solution tends to break the glucose chain. Barium hydroxide may be employed in the place of barium carbonate, but in that case greater care is required to prevent the formation of an alkaline solution. Sodium, potassium and ammonium carbonates and hydroxides may likewise be employed, but are less desirable since the sodium, potassium and ammonium ions do not precipitate as readily in alcohol. This reduces the yield of the process. Calcium carbonate is subject to the further defect that it will not completely neutralize the acids.

The above described process produces almost the full theoretical yield of pure glucuronic acid from methyl glucoside, as compared with yields of less than ten per cent with the slower and more complicated process of obtaining pure glucuronic acid disclosed in applicant's prior application referred to above. If the above described hydrolyzing step to remove combined nitrogen dioxide is omitted, yields in the order of fifty per cent of the theoretical can be obtained, provided the impure methyl gulcuronic acid, prior to removal of the methyl group, is converted to pure methyl barium glucuronate in the following manner:

The methyl glucuronic acid, after removal of the barium nitrate and ethyl (or methyl) nitrite and the vacuum distillation, is dissolved in water and an excess of barium carbonate is added to neutralize the methyl glucuronic acid and thus produce barium methyl glucuronate. The solution is concentrated by vacuum distillation at a temperature not to exceed 50° C., to the consistency of a filterable syrup. This removes all of the alcohol. The material is then filtered to remove the excess barium carbonate, and its volume is further reduced by vacuum distillation to a syrup consistency. The syrup is then poured into absolute alcohol, which precipitates methyl barium glucuronate and barium salts of certain cellulosic condensation products which result from a breakdown of the glucose chain. The remaining impurities remain dissolved. The solution is filtered to remove the precipitates and the precipitates are dried and dissolved in cold water. Since only methyl barium glucuronate is soluble in cold water, all of the remaining impurities are removed by filtration, leaving a water solution containing only methyl barium glucuronate, except that, as previously indicated, some of the material contains combined nitrogen dioxide.

The methyl barium glucuronate is then hydrolyzed and processed in the manner described above to produce glucuronic acid, the only difference being that in the hydrolyzing operation the barium precipitates as barium sulphate and is removed with the excess barium carbonate used to neutralize the acids. The resulting product is a mixture of pure glucuronic acid and nitroglucuronic acids, and the latter may be converted to pure glucuronic acid by hydrolyzing with sulphuric acid at low temperature, and the acids neutralized in alcohol and their salts removed by filtration and vacuum distillation in the manner employed with the methyl glucuronic acid in the preferred process.

It will also be understood that, if desired, the preferred process, first described above, may be modified by converting the impure methyl glucuronic acid to pure methyl barium glucuronate after the combined nitrogen dioxide has been removed and prior to the second hydrolyzing operation. This can be accomplished in the manner described above.

While several forms of the process are set forth herein, it will be apparent that other variations in the sequence and character of the steps may be indulged in without departing from the spirit of the invention or the scope of the appended claims.

What is claimed is:

1. The method of producing glucuronic acid, comprising first oxidizing a glucoside having a protected aldehyde group and a free primary alcohol group with nitrogen dioxide to form the corresponding derivative of glucuronic acid, extracting the oxidation products with alcohol and neutralizing nitric acid in the alcohol solution, recovering the alcohol soluble constituents from the solution and extracting the same with water, neutralizing said derivative of glucuronic acid in the aqueous solution and precipitating the salt thus formed in alcohol, extracting the substantially pure salt of the glucuronic acid derivative from the residue with water, hydrolyzing the salt while in aqueous solution with a mineral acid, and removing the mineral acid and other impurities.

2. The method of producing glucuronic acid, comprising first oxidizing a glucoside having a protected aldehyde group and a free primary alcohol group with nitrogen dioxide to form the corresponding derivative of glucuronic acid, separating combined nitrogen dioxide from the oxidized glucose compound by hydrolysis at a temperature not exceeding 40° C., extracting the oxidation products with alcohol and neutralizing nitric acid in the alcohol solution, recovering the alcohol soluble constituents from the solution and extracting the same with water, neutralizing said derivative of glucuronic acid in the aqueous solution and precipitating the salt thus formed in alcohol, extracting the substantially pure salt of the glucuronic acid derivative from the residue with water, hydrolyzing the salt while in aqueous solution with a mineral acid, and removing the mineral acid and other impurities.

3. The method of producing glucuronic acid which includes subjecting a glucose compound having a free primary alcohol group and a protected aldehyde group to the action of a mixture of nitrogen dioxide and oxygen to convert the alcohol group to a carboxyl group, and separating glucuronic acid in solution by hydrolysis at a temperature not exceeding about 90° C.

4. The method of producing a glucuronic acid compound which includes exposing crystalline methyl glucoside in a finely divided state to an atmosphere of oxygen and nitrogen dioxide at a temperature not exceeding 50° C. and thereafter separating glucuronic acid by hydrolysis at a temperature not exceeding about 90° C.

5. The method of producing a glucuronic acid compound which includes dropping finely divided crystalline methyl glucoside by gravity into an upwardly moving column of a mixture of nitrogen dioxide and oxygen and thereafter separating glucuronic acid by hydrolysis at a temperature not exceeding about 90° C.

6. In the method of producing glucuronic acid which includes subjecting a glucose compound having a free primary alcohol group and a protected aldehyde group to the action of nitrogen dioxide to convert the alcohol group to a carboxyl group and thereafter separating glucuronic acid in solution by hydrolysis, the step of separating combined nitrogen dioxide from the oxidized glucose compound by hydrolysis at a temperature not exceeding 40° C.

EARL A. PETERMAN.

REFERENCES CITED

The following references are of record in the file of this patent:

UNITED STATES PATENTS

| Number | Name | Date |
|---|---|---|
| 2,232,990 | Yackel et al. | Feb. 25, 1941 |
| 2,379,917 | Mark et al. | July 10, 1945 |

OTHER REFERENCES

Maurer et al., Ber. Deut. Chem. Gessell., vol. 75, pages 1490–1491 (1942).